(12) United States Patent
Jensen et al.

(10) Patent No.: US 8,832,306 B2
(45) Date of Patent: Sep. 9, 2014

(54) INTELLIGENT INFORMATION DISSEMINATION

(75) Inventors: Daniel Jensen, Stockholm (SE); Ulf Ahlenius, Bromma (SE)

(73) Assignee: OMX Technology AB, Stockholm (SE)

( * ) Notice: Subject to any disclaimer, the term of this patent is extended or adjusted under 35 U.S.C. 154(b) by 0 days.

(21) Appl. No.: 12/659,019

(22) Filed: Feb. 23, 2010

(65) Prior Publication Data

US 2010/0312814 A1 Dec. 9, 2010

Related U.S. Application Data

(62) Division of application No. 11/641,960, filed on Dec. 20, 2006, now abandoned.

(51) Int. Cl.
*G06F 15/16* (2006.01)
*G06Q 40/04* (2012.01)
*G06Q 40/06* (2012.01)

(52) U.S. Cl.
CPC ............... *G06Q 40/04* (2013.01); *G06Q 40/06* (2013.01)
USPC ............. 709/235; 709/205; 709/217; 705/37; 715/864; 715/866; 455/414.1; 455/412.1

(58) Field of Classification Search
USPC ...................... 709/217–219; 711/1; 705/7.29
See application file for complete search history.

(56) References Cited

U.S. PATENT DOCUMENTS

| | | | |
|---|---|---|---|
| 5,077,665 A | 12/1991 | Silverman et al. | |
| 6,154,766 A | 11/2000 | Yost et al. | |
| 6,260,025 B1 | 7/2001 | Silverman et al. | |
| 6,816,456 B1 | 11/2004 | Tse-Au | |
| 6,847,971 B1 | 1/2005 | Balaraman et al. | |
| 7,194,468 B1* | 3/2007 | Bacila et al. | 1/1 |
| 7,680,721 B2* | 3/2010 | Cutler | 705/37 |
| 7,801,801 B2* | 9/2010 | Rosenthal et al. | 705/37 |
| 7,831,506 B2* | 11/2010 | Andrews | 705/37 |
| 2001/0044835 A1 | 11/2001 | Schober et al. | |
| 2002/0089437 A1* | 7/2002 | Le et al. | 341/60 |

(Continued)

FOREIGN PATENT DOCUMENTS

| | | |
|---|---|---|
| EP | 1 202 501 | 5/2002 |
| EP | 1 633 092 | 3/2006 |

(Continued)

OTHER PUBLICATIONS

U.S. Appl. No. 11/641,960, filed Dec. 20, 2006; Inventor: Daniel Jensen et al.

(Continued)

*Primary Examiner* — Greg C Bengzon
(74) *Attorney, Agent, or Firm* — Nixon & Vanderhye P.C.

(57) ABSTRACT

The invention is suitable for any kind of distributed networks having different data rates on different connections and a centralized computer system wherein the data to distribute is created. The central system comprises one or more supersets of data that is to be distributed to client computers by extracting subsets of data from the superset/s of data. Thereafter the subsets of data are distributed to selected groups of clients based on information about the network architecture. In this way an efficient way of distributing data is executed and no duplicated data is distributed. Preferably the subsets are distributed to clients based on a counter performance or a data rate of a client's connection to the central computer system.

22 Claims, 8 Drawing Sheets

(56) References Cited

U.S. PATENT DOCUMENTS

| | | | |
|---|---|---|---|
| 2002/0120837 A1* | 8/2002 | Maxemchuk et al. | 713/153 |
| 2003/0110280 A1 | 6/2003 | Hinchliffe et al. | |
| 2003/0135419 A1 | 7/2003 | Haulk et al. | |
| 2003/0229570 A1 | 12/2003 | Hughes, Jr. et al. | |
| 2003/0231648 A1 | 12/2003 | Tang | |
| 2004/0010456 A1 | 1/2004 | Hoang | |
| 2004/0090959 A1 | 5/2004 | Cinghita et al. | |
| 2005/0188112 A1 | 8/2005 | Desai et al. | |
| 2005/0273421 A1 | 12/2005 | Rosenthal et al. | |
| 2006/0080267 A1 | 4/2006 | Nelken | |
| 2006/0294228 A1 | 12/2006 | Almstrom | |
| 2007/0005481 A1* | 1/2007 | Kedia et al. | 705/37 |
| 2008/0177652 A1* | 7/2008 | Weiss | 705/37 |
| 2009/0182657 A1* | 7/2009 | Altius | 705/37 |
| 2010/0125551 A1* | 5/2010 | Bacila et al. | 707/636 |
| 2012/0095893 A1* | 4/2012 | Taylor et al. | 705/35 |

FOREIGN PATENT DOCUMENTS

| | | |
|---|---|---|
| GB | 2 383 149 A | 6/2003 |
| GB | 2 395 408 | 5/2004 |
| GB | 2 411 492 | 8/2005 |
| JP | 2004/146881 | 5/2004 |
| JP | 2005-309968 | 11/2005 |
| JP | 2006-330933 | 12/2006 |
| WO | WO 01/89176 A2 | 11/2001 |
| WO | WO 02/091650 | 11/2002 |
| WO | 2004/008309 | 1/2004 |
| WO | WO 2005/055002 | 6/2005 |
| WO | 2005/083603 | 9/2005 |

OTHER PUBLICATIONS

U.S. Appl. No. 11/641,955, filed Dec. 20, 2006; Inventor: Daniel Jensen et al.

U.S. Appl. No. 11/641,957, filed Dec. 20, 2006; Inventor: Staffan Lantz et al.

International Search Report issued for International Patent Application PCT/EP2007/063193, dated May 9, 2008.

International Search Report issued for International Patent Application No. PCT/EP2007/064003, dated Apr. 4, 2008.

International Search Report issued for International Patent Application No. PCT/EP2007/064005, dated Apr. 22, 2008.

Office Action mailed May 29, 2009 in co-pending U.S. Appl. No. 11/641,955.

Office Action mailed Dec. 8, 2009 in co-pending U.S. Appl. No. 11/641,955.

Office Action mailed Jun. 5, 2009 in co-pending U.S. Appl. No. 11/641,960.

Labio, Wilbert Juan, et al., "Efficient Snapshot Differential Algorithms for Data Warehousing," Proceedings of the 22 VLDB Conference, 1996, pp. 63-74.

Ram, Prabhu et al., "Extracting Delta for Incremental Data Warehouse Maintenance," Proceedings of the $16^{th}$ International Conference on San Diego, CA USA, Data Engineering 2000, pp. 220-229.

Written Opinion Singapore Patent Application No. 200903818-3, Jan. 26, 2010.

Summary of Japanese official action, Mar. 2, 2012, in corresponding Japanese Application No. 2009-541951.

* cited by examiner ic # INTELLIGENT INFORMATION DISSEMINATION

This application is a divisional of U.S. application Ser. No. 11/641,960, filed on Dec. 20, 2006 now abandoned, the entire content of which is hereby incorporated by reference in this application.

TECHNICAL FIELD

The technology relates to distribution of data in computer systems, and in particular, to information dissemination in high performance trading systems.

BACKGROUND

Today it is very common that information is sent over computer networks. The amount of information being sent is rapidly increasing due to the advances in technology, making it possible to send and handle more information at higher speed. Furthermore, new applications demand a higher amount of information. Even further, the importance of information has opened up a new field of business wherein information is sold.

An example of computer systems where information dissemination important is electronic trading systems.

Electronic trading of securities, derivatives, commodities, and other financial instruments result in large amount of information which has to be distributed to users that need the information for making trade decisions, statistical calculations, and other assessments. Furthermore, the users connected to such a centralised trading system want to have the information as soon as possible. In these cases it may not be enough to only boost the performance in the central system by for example updating the hardware, in order to get rid of a bottleneck or other latency problem in the system. Usually these bottlenecks end up at the user side anyway, since the users may have limited possibilities to update their connection to the central system.

Thus, this type of central system has to generate and distribute a lot of data to many different users not only on a continuous basis but also at specific times and occasions during a trading day, and it has to be done in an efficient way.

An example of a system for providing electronic information is described in US 2005/0273421. This document describes a system wherein the trading information and multiple types of electronic information are sent in the same data stream. Providing electronic trading information and electronic information on the same data stream significantly increases the computations required by a target device and by servers used by electronic trading providers to separate the information. The system disclosed in US 2005/0273421 solves this problem by splitting the first data stream into plural second data streams that can be selectively requested, displayed, and used by a user. Each of the plural second data streams includes one or more of the plural different types of electronic trading information from the first data stream, thereby allowing an individual target device to selectively request, receive, and use the one or more of the plural types of electronic trading information in the second data stream faster than using the same electronic trading information from the first data stream.

However, this type of filtering is often too rough since a user/client is most likely also interested in other data streams. Thus the above described system has drawbacks, especially in environments having limited bandwidth, since it splits the information based on the type of electronic information. Hence the above system is not particularly helpful in networks where the data rates of the connections for users is limited and varies between different users.

A trading system may have other functionalities for distributing information. However, the problem is that they require the system to generate and send duplicated information.

These functionalities may for example generate one message flow for a user A (with a great connection) that contains the entire depth and one message flow for a user B (with a poor connection) that contains a limited picture of the market (top X levels). The two messages contain duplicated information for the top X levels resulting in an extra load on both the central systems performance and the traffic on the central and peripheral networks.

Another problem is that usually there is a central processor/s that aggregates the information and distributes it. Since the processor has to use time on aggregating and spreading duplicated information, there is less time for other tasks such as receiving information, and thus, bottlenecks may occur in other parts of the system.

Another problem is consideration of counter performances provided by customers when distributing data. Some customers may experience an unfair treatment.

SUMMARY

Thus it is an object to provide a solution for disseminating data in a more efficient way.

It is another object to provide a solution for sending out data to users having different data rate of their data connections.

It is another object to provide a solution for sending out data in a bandwidth efficient way.

It is another object to provide a solution for sending out data without the need of duplicating the data.

It is another object to consider customer counter performances when sending out data.

According to a first aspect the above and other objects are achieved by a computer system for sending data sets to a plurality of clients via a network, the computer system comprising:
  a memory comprising a superset of sorted data elements,
  an extractor associated with the memory for extracting, from the superset of sorted data, a first subset of data elements and a second subset of data elements, the second subset being different from the first subset,
  a selector associated with the memory for selecting a first and a second group of clients, the second group of clients being a subset of the first group of clients, and
  a communicator associated with the extractor and selector, for sending the first subset to the first group of selected clients, and for sending the second subset to the second group of selected clients.

The above computer system has the advantage that it provides a solution that makes it possible to disseminate data in a more efficient way. The system makes it possible to send data using less bandwidth (data rate) and performance in the computer system since duplications of messages are preferably not extracted or sent.

The devices in the system are connected to each other by interfaces. There are two types of interfaces: hardware interfaces and software interfaces.

Hardware interfaces are plugs, sockets, cables and electrical signals traveling through them. Examples are USB, FireWire, Ethernet, ATA/IDE, SCSI, PCI and so forth.

Software interfaces (programming interfaces) are the languages, codes and messages that programs use to communicate with each other and to the hardware. Examples are the Windows, Mac and Linux operating systems, SMTP e-mail, IP network protocols and the software drivers that activate the peripheral devices.

Both types of interfaces are needed in order to get the internal and external devices in a computer system/network to communicate with each other.

The term data element may be referred to as a named unit of data that, in some contexts, is considered indivisible and in other contexts may consist of data items. In this document the data element can either be considered indivisible or it may consist of data items. Preferably the data elements in this document are sorted according to ranking rules. For example the data elements could be sorted by ranking rules such as: price, time, price and time, traders before market makers, inverted price or sorted by volume and so forth, or any combination of the ranking rules.

The superset may comprise a number of data elements that are to be distributed to a plurality of clients. Preferably the superset of data elements is stored in a memory such as in the primary memory, e.g., the cache memory, RAM, DRAM and so forth, or in a secondary memory such as hard disk, USB memory or the alike. However, since the primary memory (ies) are much faster compared to the secondary memory(ies), the primary memory(ies) are better suited for the task.

The data elements may comprise data relating to orders in an order book. An order is typically an instruction issued by a client. Usually the order is a buy or a sell order for a certain or a plurality of financial instruments. However there exist many different types of orders; therefore, in this document, orders are not only limited to buy or sell orders.

Examples of preferred content of a data element include at least one of the following data: trader identity, series, bid or ask, price, quantity, account or client. The data element may also include other fields such as a free text field and so forth.

The subsets may comprise extracted parts of the superset of data. Preferably the subsets do not overlap each other with regard to data elements. The superset can therefore be represented by a number of subsets.

How many data elements each subset should comprise may be chosen by a system administrator at the central computer system. For example the subset representing the first part of the superset may comprise five levels of data elements, the subset representing the second part of the superset may comprise the following ten levels of data elements and the subset representing the third part of the superset may comprise the remaining data elements in the superset. This is just an example of one embodiment, in other embodiments more subsets comprising less data elements may be used in order to represent the superset, or less subsets comprising more data elements.

In a further embodiment it is possible for a client to subscribe to subsets comprising a number of data elements chosen by the client. Hence it would be possible to tailor the size of the subsets to individual customer needs. The size and number of subsets could also be based on a counter performance of a customer, such as payment, number of trades and so forth. More examples are mentioned below in the text.

The selector in the computer system preferably selects a group of clients based on at least one of the following:
 a data rate of a client's connection to the network,
 a subscription associated to a client.

In this way the dissemination of data can be done in an intelligent/selective way since the computer system is able to detect a data rate on a connection to a client. This may be done by measuring the data rate on the data connection or by information received from the client, or by information from a message bus and so forth. Thus the selector may select a group of clients based on a combination of data rate and subscription or based on one of them alone. In another situation the selector may select a group of clients based on an infrastructure load.

The input regarding data rate or "infrastructure load" may be obtained by measuring the data rate on the data connection, processor load at the central system, or by information related to an application program received from a client computer, or by information from a bus such as an intelligent message bus with ability to measure current bandwidth situation at different locations by use of network surveillance tools. Hence the infrastructure load may be related to any activity in the market on an electronic exchange.

Furthermore, it may also be possible for a client to provide change-levels to the central system regarding the data rate on the connection. Thus if the measured data rate on a connection exceeds an upper change-level the connection is busy and less information can be sent via the connection. If the measured data rate on the connection falls below a lower change-level the connection is not busy and more information can be sent. By providing this functionality the system can always make sure that a certain client receives the best service of information based on the data rate.

It is also possible for the central system to control its information dissemination based on the above so that orders sent from the client are not prevented from entering the central system. Thus if the measured data rate on a connection to a client is high the central system may decide to wait or cancel some of the information that will be sent to the client. By providing this functionality the system can always make sure that a certain client's orders/request into the central system will arrive faster since the connection is not busy with other information sent from the exchange.

Preferably the superset of sorted data elements comprises data relating to at least one of the following data:
 market by order data,
 market by level data/market by price data.

However, data in any sorted list may be used and not only the data mentioned above. The above may be used where it is hard for an external application to sort the incoming data. By sending the data already sorted it speeds up the processing of the received data for a client computer.

Furthermore the data elements in the subsets of data comprise at least one of the following:
 data structured as delta-changes of at least a part of the data elements of at least a part of the superset,
 data structured as the data elements of at least a part of the superset.

By sending the delta-changes valuable bandwidth can be saved. If only one part of a data element in the superset has changed it may be better to only send the delta change of that part in order to update the data set at the client computer. However in other situations it may be more efficient to send one or more data elements to replace obsolete data elements at the client. In these cases a snapshot of the superset of data can be sent and the amount of bandwidth to be used becomes easier to calculate and predict.

By sending the changes using delta changes it is possible to keep a list at a client computer updated in real time without the need of providing the whole list each time. Furthermore little bandwidth may be used each time for each message. However logic is necessary at the client computer since the client has to be able to perform implicit actions/calculations on the data received. Preferably used for long lists with few changes/updates.

Sending the changes by snapshots makes it is easier for a client computer since it is not necessary for the client computer to apply any logic on the data received. The client computer only replaces the old message with the new message and no further implicit calculation/action is usually necessary. Furthermore it is possible to limit the maximum bandwidth by hold-back timers, however more bandwidth is necessary for each message. Preferably used for short lists with many updates/changes.

The memory mentioned above may further comprise an area, accessible by the selector for storing subscriptions associated with clients. By having this feature it becomes easier for the selector to select groups of clients since the subscription may comprise information such as: customer needs, the connections data rate, number of trades, the client's turnover, client status such as market maker and so forth.

The subscription associated with a client is preferably based on at least one of the following:
    the data rate of the connection to the client,
    a counter performance from the client,
    client rights.

Since clients usually have to pay for the subscriptions of information, the service or quality level of the subscriptions varies. For example the more a client pays the more information the client can obtain. Thus as mentioned above the subscription may be associated with a client based on the connection the client has. The client will get a subscription suitable for the data rate on the connection. The reason for this is that the client may be restricted by the connection so that the client can only receive a certain amount of data. However the subscription may also be based on a counter performance from the client. In this case the connection to the client does normally not constitute a bottleneck with regards to data-rate. Thus depending on the counter performance the subscription associated to the client may change. Example of counter performances can be: payments, or turnover at the clients account, liquidity provided by the client, number of trades the client has done, data received from the client and so forth. Hence, the more the client trades he will be upgraded to a subscription with a better service or quality.

The clients may be associated with specific rights, "client rights". For example a market maker may have some privileges/rights compared to other clients. Thus some information could be associated with specific rights and thereby only sent to the clients having that right/privilege.

The data rate of the connection to the client can be measured in many different ways. A few examples (as mentioned earlier) are; by measuring the data rate on the connection and/or by information provided by the client and/or information provided by a data message bus using surveillance tools known to the person skilled in the art.

The extractor preferably extracts a subset of data elements from the superset of sorted data elements upon at least one of the following events:
    a change in the superset,
    at certain time intervals decided by a holdback timer,
and by use of the communicator, sending the subsets to selected group of clients.

When to extract and/or send a subset may be chosen depending on the situation. If changes in the superset do not occur so often it may be more efficient to extract data elements from the superset upon a change in the superset. Another solution is to extract data elements at certain time intervals decided by a holdback timer. In these cases it is easier to predict bandwidth utilization in the system.

Furthermore data elements may be extracted by a combination of the two above. For example, as a default, data elements could be extracted at certain time intervals but if no change in the superset occurs there is no need to send any information. Thus the systems checks if any change has occurred and if no change has occurred in the superset no data elements are extracted or sent not even at certain time intervals. Not until a change is detected by the system, does the system start sending data elements at certain time intervals until no change in the superset is detected again. The system waits until a change occurs and then starts sending data elements again.

Therefore, the computer system may furthermore comprise a comparator associated with the memory, for detecting at least one location of a change in the superset of sorted data elements, and based on the location sending a subset associated with the location to clients subscribing for the subset. Furthermore changes in adjacent subsets which occur as a consequence of the change in the superset are preferably added to the subset being sent. Thus the subset being sent preferably comprises an additional data element, originally associated with another subset, if the change was e.g. a deletion of a data element in the superset.

The memory in the computer system may further comprise a second superset of sorted data elements; the data elements in the second superset preferably comprise one or more of the data elements from the first superset.

Thus two supersets may be used for extracting and sending data to the clients. The second superset is preferably treated the same way as the first superset. However since the second superset may have data elements sorted in a different way changes may occur at other positions in the superset.

In a second aspect, the above and other objects are fulfilled by an electronic exchange comprising the computer system as mentioned above.

The computer system may thus be an integrated module in an electronic exchange. It can also be a stand alone module that can be sold separately as an information dissemination system.

In a third aspect, the above and other objects are fulfilled by a method implemented on a computer system for sending data sets to a plurality of clients via a network, the method comprising the steps of:
    extracting from a superset of sorted data elements, a first subset and a second subset, the second subset being different from the first subset,
    selecting a first and a second group of clients, the second group of clients being a sub set of the first group of clients, and
    sending, the first subset to the first group of selected clients, and sending the second subset to the second group of selected clients.

The above method has the advantage that it provides a solution that makes it possible to disseminate data in a more efficient way. The method makes it possible to send data without affecting bandwidth and performance in the computer system since duplications of messages are preferably not extracted or sent.

The method may further comprise the step of selecting groups of clients, based on at least one of the following input:
    a data rate of a clients connection to the network, and
    a subscription associated to a client.

In this way the dissemination of data can be done in a smart way since the method makes it possible to sense a data rate on a connection to a client. For example this may be done by measuring the data rate directly on the connection, or based on information from the client, another solution could be to receive information from a message bus and so forth. Thus the selector may select a group based on a combination of data rate and subscription or based on one of them alone.

The method may further comprise the step of arranging the data in the subsets according to at least one of the following arrangements:
   data structured as delta-changes of at least a part of the data elements of at least a part of the superset,
   data structured as the data elements of at least a part of the superset.

By arranging the data in the subsets valuable bandwidth can be saved. If only one part of a data element in the superset has changed it may be better to only send the delta change of that part in order to update the data set at the client computer. However in other situations it may be more efficient to send one or more data elements to replace obsolete data elements at the client. In these cases a snapshot of the superset of data can be sent and the amount of bandwidth to be used becomes easier to calculate and predict.

In another embodiment the method may comprise the step of associating the subscription with a selected client based on at least one of the following input:
   the data rate of the connection to the client,
   a counter performance from the client, and
   client rights.

The extracting step, preferably extracts the subsets from the superset of data elements upon at least one of the following events:
   a change in the superset,
   at certain time intervals decided by a holdback timer,
and by use of the communicator, sending the subsets to selected group of clients.

When and how the subset is extracted may be chosen depending on the specific situation. For example if changes in the superset do not occur often, it may be more efficient to extract data elements from the superset upon a change in the superset. However if changes continuously occur at relatively high speed, the solution may be to extract data elements (snapshot) at certain time intervals decided by a holdback timer. In these cases, it is easier to predict bandwidth utilization in the system, and it may be more bandwidth efficient to do it this way.

Thus the system may chose to send a snapshot of a part of the dataset. When using snapshots a holdback timer may be used in order to decide when a snapshot should be sent. For example a snapshot of the four uppermost data element is sent every second. The size of this message will always be the same (e.g. 4 bytes, 1 bytes per element). Another solution would be to send a data element for each update when it occurs. If during this second 100 updates occur this would result in 100 data elements a 1 byte, being sent. Thus 100 bytes is sent during the interval of one second. From a bandwidth perspective it may thus be better to use the snapshot and timer technique in this situation.

As described earlier, data elements may be extracted by a combination of the two techniques: upon a change and upon time intervals.

The method may further comprise the following step:
   detecting at least one location of a change in the superset, and based on the location sending a subset associated with the location to clients subscribing for the subset.

This has the advantage that only the subset comprising the change in the superset will be extracted and sent to a client. In this way bandwidth and other system resources such as processor time will be saved.

The method may also comprise the following step:
   adding an additional data element to the subset being sent to the selected client if the change was a deletion of a data element in the superset.

This has the advantage that processing of the data elements can be done at the client computer since a deletion/removal of a data element in a first subset means that the first data element in the subset following the first subset has to be moved to the first subset.

Preferably the subsets of data comprise data relating to at least one of the following data:
   market by order data,
   market by level data/market by price data.

As mentioned earlier in this document the above data may be used where it is hard for an external application to sort the incoming data. By sending the data already sorted it speeds up the processing of the received data for a client computer.

In a fourth aspect, the above and other objects are fulfilled by a client computer for management of sorted data elements, the client computer comprising:
   an interface for receiving an update message, the update message comprising data relating to sorted data elements,
   a memory comprising a set of sorted data elements and for storing the data relating to sorted data elements,
   a display for displaying a number of the sorted data elements,
   a message handler for managing the set of sorted data elements based on the data in the update message.

The above client computer has the advantage that it provides a solution that makes it possible to process data received from a computer system in a more efficient way. Since the sorted data elements in the memory needs to be updated at certain time intervals so that a user of the computer can see what is happening at a central computer system such as in an order book, the client computer comprises a message handler that treats the data elements based on the information received in the update message. Thus if the client computer receives an update message comprising delta changes it adds the delta changes to the data elements stored in the memory. If the client computer receives an update message comprising data elements it may replace the obsolete data elements in the memory in order to provide an accurate and correct data to a user of the client computer.

The client computer may further comprise a management module for executing implicit operations on the stored set of sorted data elements based on the data in the update message. The implicit operations preferably relates to at least one of the following operations: push operation, pop operation, delete operation and so forth.

The implicit operations are executed by the client computer on the local dataset stored in the memory of the client computer. The implicit operation is based on the content of the update message in order to create a sorted dataset at the client computer.

The data in the update message may be chosen from the group of data comprising:
   add data, for adding a new data element,
   remove data, for removing a data element, and
   change data, for changing a data element.

Depending on the data the client computer receives in the update message the client computer performs certain operations as described above.

In a fifth example embodiment, the above and other objects are fulfilled by a computer program product according to any of the previous described embodiment, the computer program product being stored on a data carrier.

These and other aspects will be apparent from and elucidated with reference to the example embodiments described hereinafter.

DETAILED DESCRIPTION

In this application some specific terms are used as described below.

Figure 3:
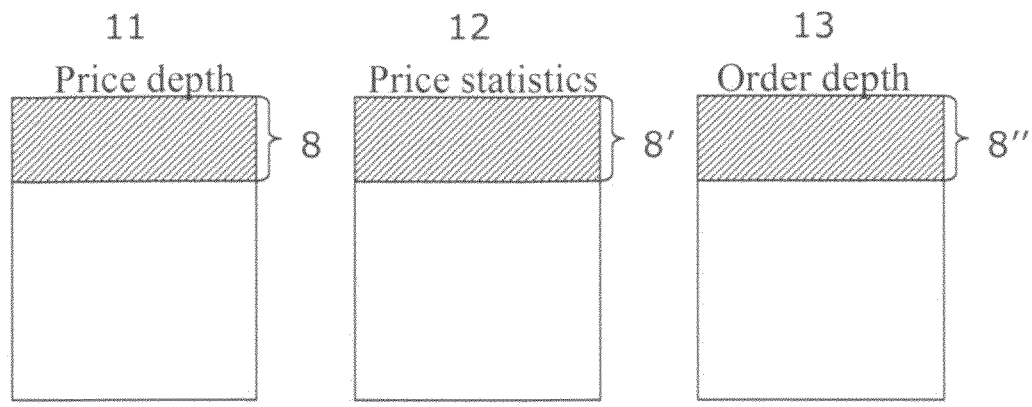
FIG. 3 illustrates three different supersets of data.

MBO—Market By Order—In FIG. 3 this type of message 13 is pictured. This type of message flow contains the order book changes that occur in the order depth for an instrument. Each change will be represented in a message by a delta change. The external applications can use this information to build up their order depth for this order book and maintain a shadow of the real order book. It is possible to say that only order changes that occurs on the top X levels shall be distributed and by doing so the external application will have a copy of the order depth for those levels.

MBP—Market By Price—This type of message 11 contains information on the price levels that exists in the market with a summary of the total volume on each level. It is possible to say that only the top Y price levels will be distributed.

A MBO example will be used in the description in order to simplify the explanation. In this example the system is configured to distribute three different levels of MBO, in order to support different type of bandwidth users. However the described technology is useful with any type of sorted lists and not only with MBO or MBP message information.

Figure 1:
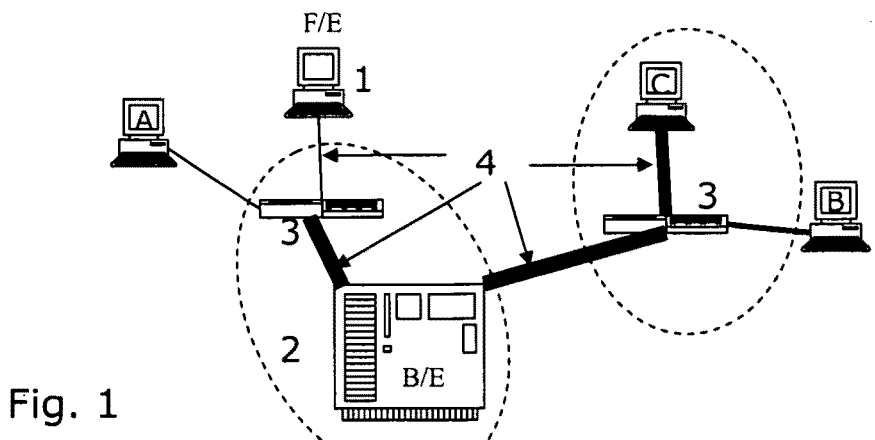
FIG. 1 illustrates an overview of a computer network having different data rates on the connections between the devices.

FIG. 1 illustrates a central computer system having front-end computers 1, a back-end system 2 and gateways or routers 3. Between the different devices there is connections illustrated by lines 4 having different thickness. The thickness illustrates the bandwidth (data rate). A thick line has a high data rate and a thin line has low data rate. Three of the front end computers in FIG. 1 have a letter on the screen, this illustrates that it is a client computer belonging to user A, B and C.

Figure 2:
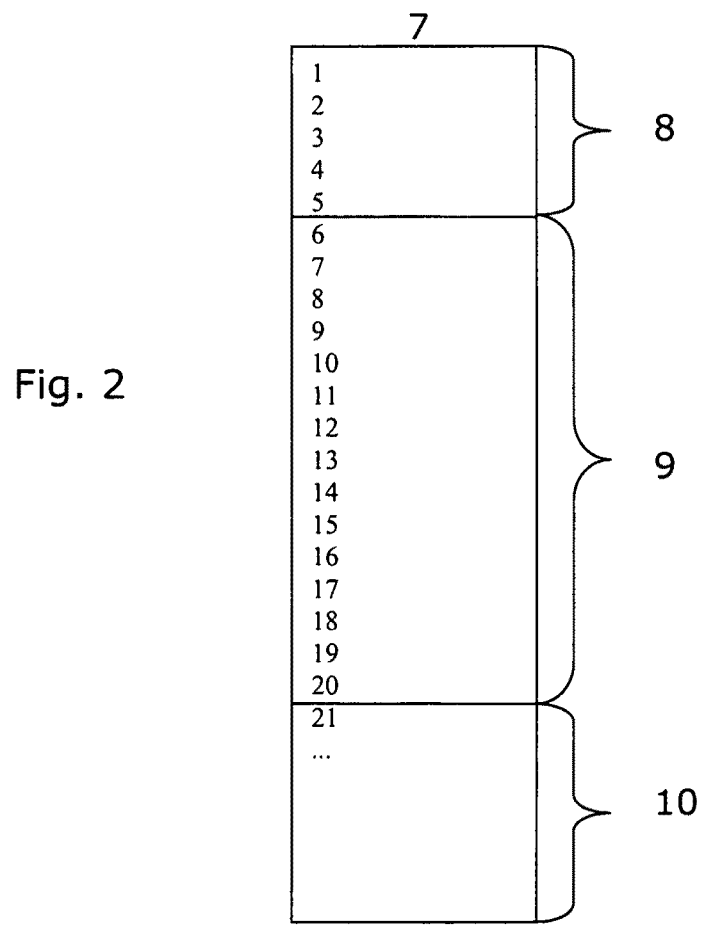
FIG. 2 illustrates an example embodiment of a superset of data and also depicturing three subsets of data.

FIG. 2 illustrates a superset of data 7 which in this example is divided into three subsets of data 8, 9, 10. The superset can be divided into more subsets each comprising less data elements or it can be divided into less subsets comprising more data elements. How many subsets that represent the superset is preferably decided based on each specific situation and system wherein the invention is going to be used. In this document however we have chosen to divide the superset into three subsets in order to make the invention easier to understand. The first subset 8 comprising five data elements (1-5), the second subset 9 comprising 15 data elements (6-20), the third subset comprising the data elements >20, e.g. 21-30.

FIG. 3 is an illustration of three supersets comprising data represented in three different ways. Price depth (MBP) 11, price statistics 12 and order depth (MBO) 13.

Figure 4:
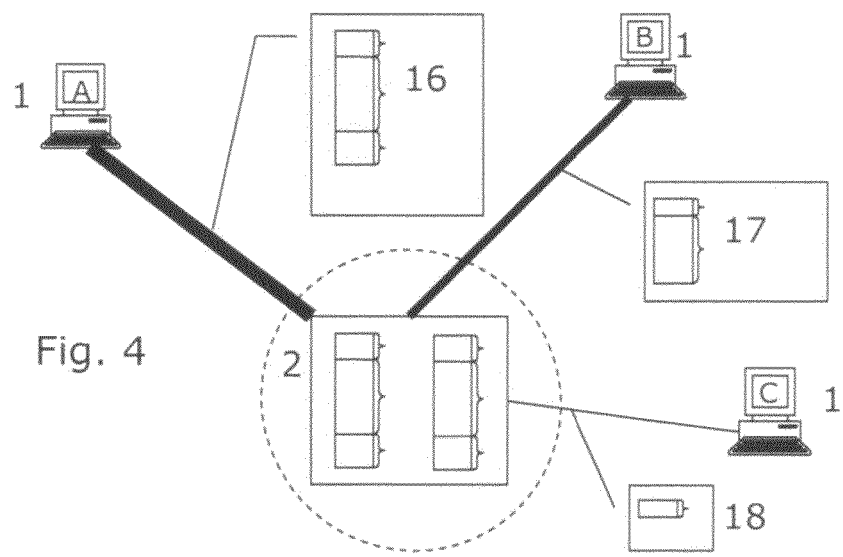
FIG. 4 illustrates an overview of a computer network having different data rates on the connections between the devices in the network. Also depicturing how the different subsets may be distributed on the different connections.

FIG. 4 illustrates a somewhat different system compared to the system in FIG. 1. The figure also illustrates what subsets of the superset that may be sent over different connections. The subset being associated with the connections of different data rates. For example the thickest data connection, connecting the central system 2 with a client A, is able to transmit the whole superset 16, the slower data connection is able to transmit the first and second subset 17 to client B, and the slowest data connection is able to transmit the first subset 18 to client C. In this example the central system 2 comprises two supersets of data, however the central system may comprise 1 or more data elements, such as 3, 4, 5 and up to 15 or more such as 100, 200, 500. This is dependent on the application being used.

Figure 5:
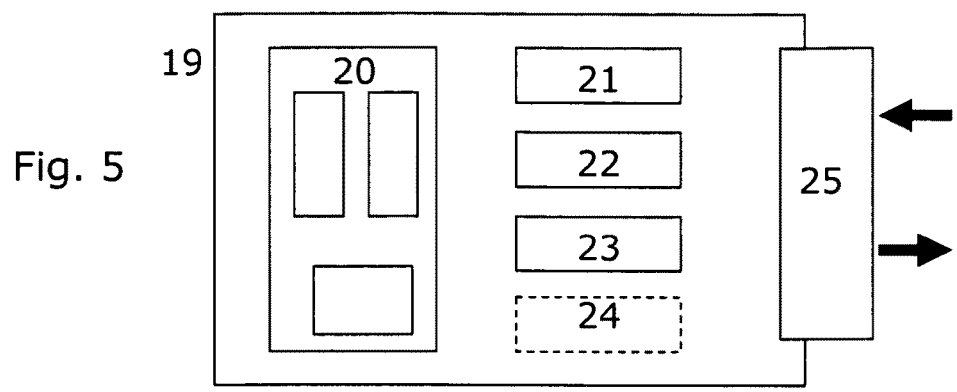
FIG. 5 illustrates a computer comprising a memory, an extractor, a selector, a communicator, a comparator and an interface.

FIG. 5 illustrates an electronic device comprising the computer system 19. The computer system 19, comprising a memory 20, an extractor 21, a selector 22, a communicator 23, a comparator 24, and an interface 25. The memory 20 comprises two supersets and an area for storing subscriptions.

In the following, the details of how the subsets may be sent to the client computers and how a client computer preferably manages the data received in the update messages sent from the central system, will be explained.

In the example provided, there exist three clients: A, B and C having different data rates on the connections as explained below.

Client A has a limited connection against the central system with poor bandwidth. He can therefore not subscribe for the entire order depth. Therefore he only wants to subscribe for the top 5 orders in the depth.

Client B is a standard member client who is trading on one of the big firms 5 and has normal connection to the central system 2. He wants to subscribe for the top 20 orders.

Client C is a high standard client that is connected to a central gateway 3 and has a high performance connection. He wants to subscribe for the entire order depth.

Below follows an example of how the technology preferably works when disseminating information from a superset 7 of data.

Client A sets up a subscription on a broadcast of the first subset 8.

Client B sets up a subscription on a broadcast first 8 and second subset 9.

Client C sets up a subscription on a broadcast first 8, second 9 and third subset 10.

Either the clients themselves sets up a subscription. However this may also be done centrally at the central computer system 2, by a system administrator or automatically by the system itself based on a number of predetermined parameters such as data rate and so forth.

The central system 2 will now have a method of distributing order book changes so that it supports different type of bandwidth clients. The trick of this is to distribute this information without the need of duplicating messages for different type of clients.

The orderbook 7 contains 30 orders on the offer side. The first subset 8 has been sent out for the top 5 orders. The second subset 9 has been sent out for the orders on position 6 to 20 and the third subset 10 has been sent out for the remaining levels.

Client A will therefore have a correct picture of the top 5 orders. Client B will have correct picture of the top 20 orders and finally client C will have a full order depth picture. See FIGS. 6, 7 and 8 where the view of each client's picture is illustrated. This may also refer to how the information is stored in the memory at each client computer and/or how it is seen on the computer screens.

Figure 6:
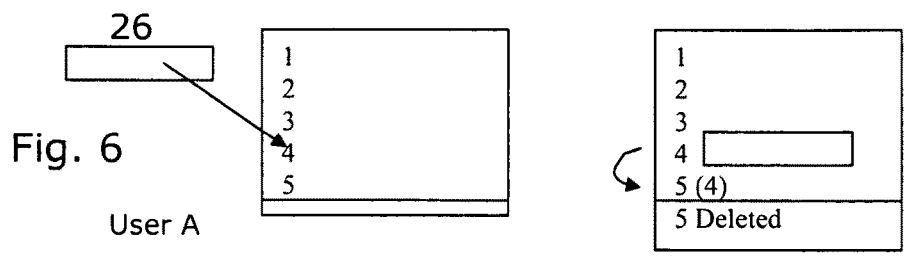
FIG. 6 illustrates an addition of a data element into a subset of data at a client computer, and the implicit operation carried out by the client computer.

The following section will explain how an add order shall be treated within the system to support this type of solution. It is based on a solution where order book changes are distributed as delta changes. The example is illustrated in FIG. 6 for client A, FIG. 7 for client B and FIG. 8 for client C.

Add

Level 1-5—A new order with a ranking position between 1 and 5.

The system generates the first subset Add order 26 broadcast. All clients will receive this broadcast 26.

In FIG. 6, client A will insert the order 26 and update the ranking position for all other orders that are affected by this change. The order that had position 5 and now has position 6 will be removed by the front-end application since the client no longer will receive any order changes for this order since he doesn't subscribe for the second subset 9 message.

Figure 7:
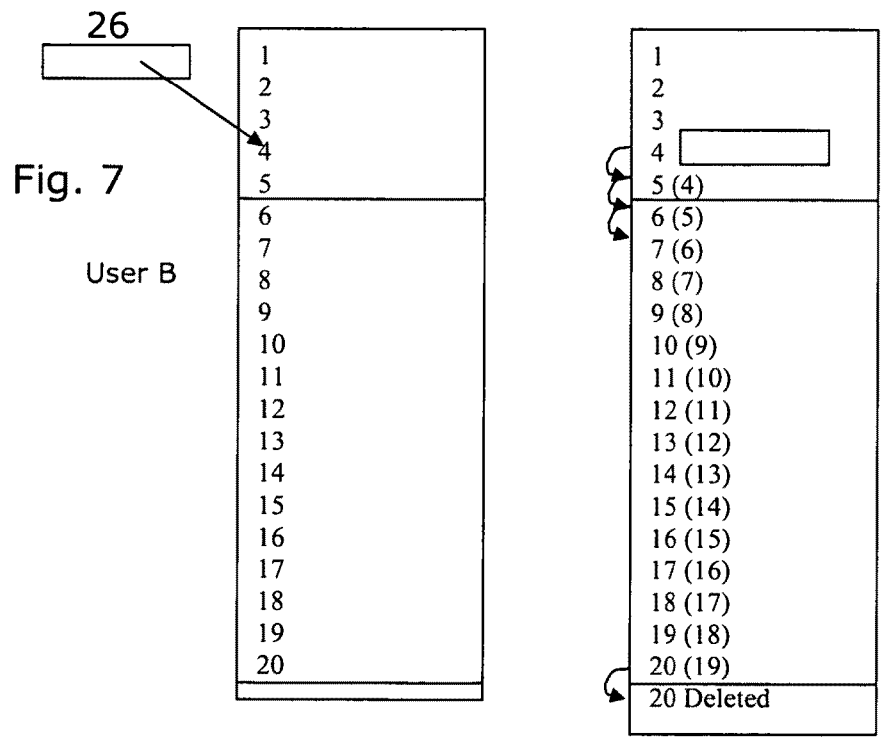
FIG. 7 illustrates an addition of a data element into a set of data comprising two subsets at a client computer and the implicit operation carried out by the client computer.

In FIG. 7, client B will insert the order 26 and update the ranking position for all other orders that are affected by this change. The order that had position 20 and now has position 21 is preferably removed by the front-end application since the client no longer will receive any order changes for this order since he doesn't subscribe for the third subset 10 message.

Figure 8:
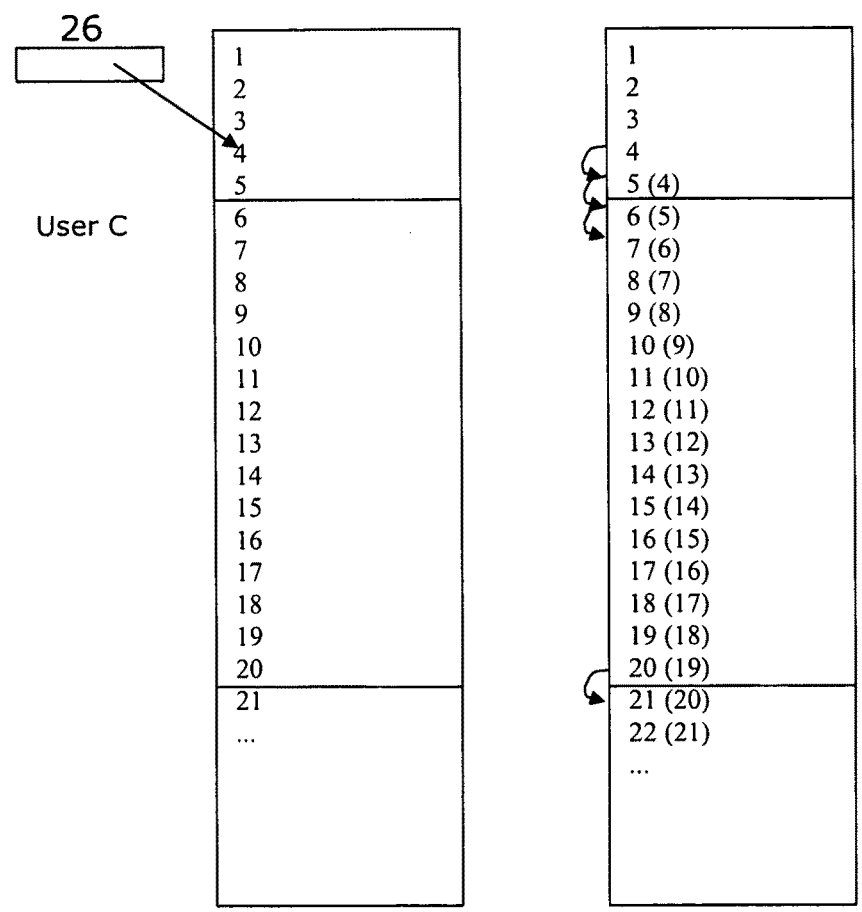
FIG. 8 illustrates an addition of a data element into a set of data comprising three subsets at a client computer and the implicit operation carried out by the client computer.

In FIG. 8, client C will insert the order 26 and update the ranking position for all other orders that are affected by this change. The front-end application does not need to delete any order since he has a full order-depth view by subscribing for all three broadcasts.

The following examples of sending a subset add order message for the second and third subset is not pictured in the figures. However the same method applies as described in the example above.

Level 6-20—A new order with a ranking position between 6 and 20.

The system generates the second subset Add order broadcast. Only Client B and Client C will receive this broadcast. Client A will not receive this message and his network connection against the central system will therefore not be affected by this change.

Client B will insert the order and update the ranking position for all other orders that are affected by this change. The order that had position 20 and now has position 21 will be removed by the front-end application since the client no longer will receive any order changes for this order since he doesn't subscribe for the third subset 10 message.

Client C will insert the order and update the ranking position for all other orders that are affected by this change. The front-end application does not need to delete any order since he has a full order depth view by subscribing for all three broadcasts.

Level 21->—A new order with a ranking position >21.

The system generates the third subset Add order broadcast. Only Client C will receive this broadcast. Client C will insert the order and update the ranking position for all other orders that are affected by this change. The front-end application does not need to delete any order since he has a full order-depth view by subscribing for all three broadcasts.

Client A and Client B will not receive this message and their network connection against the central system will therefore not be affected by this change.

Figure 9:
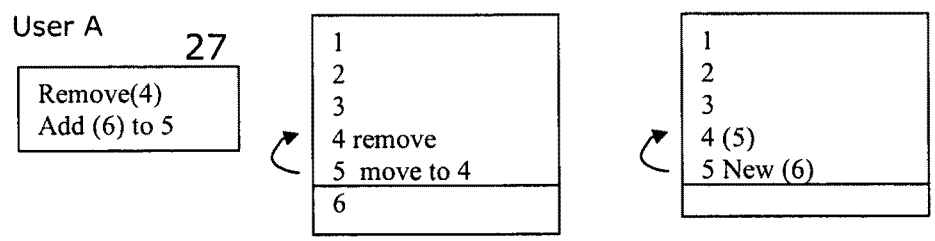
FIG. 9 illustrates an update message and a removal of a data element from position 4 of a set of data comprising one subset at a client computer and the implicit operation carried out by the client computer.
Figure 10:
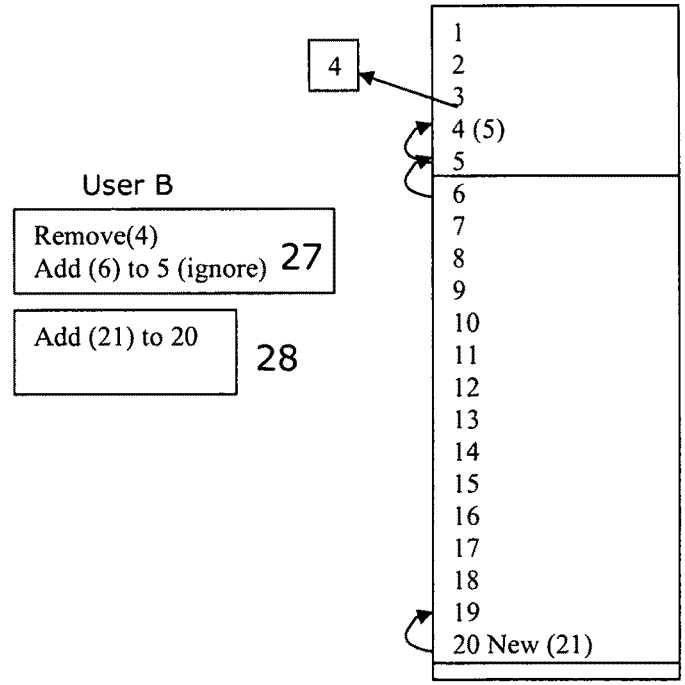
FIG. 10 illustrates an update message and a removal of a data element from position 4 of a set of data comprising two subsets at a client computer and the implicit operation carried out by the client computer.
Figure 11:
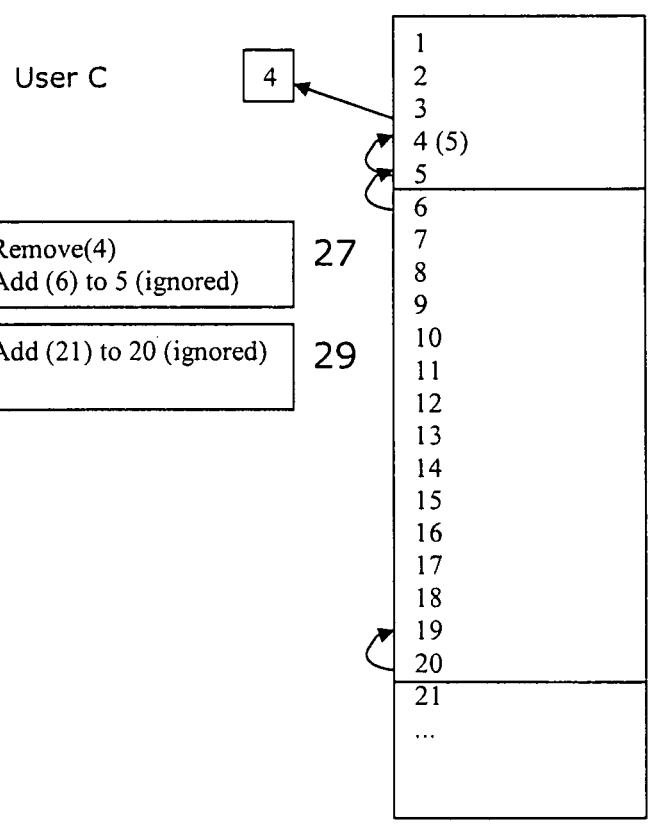
FIG. 11 illustrates an update message and a removal of a data element from a set of data comprising three subsets at a client computer and the implicit operation carried out by the client computer.

Remove:

The following example is pictured in the FIGS. 9, 10 and 11, and shows how the data sets are treated when a subset remove order message is sent.

Level 1-5—An order with a ranking position X between 1 and 5 is removed.

The system generates the first subset remove order broadcast 27. All clients will receive this broadcast 27. The broadcast 27 preferably contains 2 items. One remove on position X and one add on position 5. The Add on position 5 will contain the order that moved from position 6 to 5 as a result of the deleted order. The system will also generate a second subset add order 28 on position 20 for the order that moved from position 21 to 20. Another way of handling this would be to have an extra add record in the first subset message 27 for position 20.

Client A will remove the order on position X and improve the ranking position for all other orders that are affected by this change. The order that had position 4 will get position 3 and so on. Client A will also use the Add order in the message and insert it to the $5^{th}$ position. Client A will not receive the second subset order broadcast.

Client B will remove the order on position X and improve the ranking position for all other orders that are affected by this change. Client B's application will ignore the order Add on position 5 since he already has this order in his order depth (via the subscription on the second subset 9). However, he may also receive the second subset order 28. This broadcast contains an Add order record on position 20. Client B's application will Add this order to the $20^{th}$ position.

Client C will remove the order on position X and improve the ranking position for all other orders that are affected by this change. Client C's application will ignore the order Add on position 5 since he already has this order in his order depth (via the subscription on the second subset 9). He will also ignore the second subset order broadcast since it contains an order that he already has within his depth via his subscription on third subset 10.

The following examples of sending a subset remove order message for the second and third subset is not picturized in the figures. However the same method applies as described in the example above.

Level 6-20—An order with a ranking position X between 6 and 20 is removed.

The system generates the second subset remove order broadcast. Only Client B and Client C will receive this broadcast. The broadcast will contain 2 items. One remove on position X and one add on position 20. The Add on position 20 will contain the order that moved from position 21 to 20 as a result of the deleted order.

Client A will not receive this message and his network connection against the central system will therefore not be affected by this change.

Client B will remove the order on position X and improve the ranking position for all other orders that are affected by this change. The order that had position 15 will get position 14 and so on. Client B will also use the Add order in the message and insert it to the $20^{th}$ position.

Client C will remove the order on position X and improve the ranking position for all other orders that are affected by this change. Client C's application will ignore the order Add on position 20 since he already has this order in his order depth via the subscription on the third subset.

Level 20—An order with a ranking position X>20 is removed.

The system generates the third subset remove order broadcast. Client C will receive this broadcast. The broadcast will contain one remove item on position X.

Neither Client A nor Client B will receive this message and their network connections against the central system will therefore not be affected by this change.

Client C will remove the order on position X and improve the ranking position for all other orders that are affected by this change.

Update:

Below follows the explanation on how an order update shall be treated within the system to support this type of solution. It is based on a solution where order book changes are distributed as delta changes.

Figure 12:
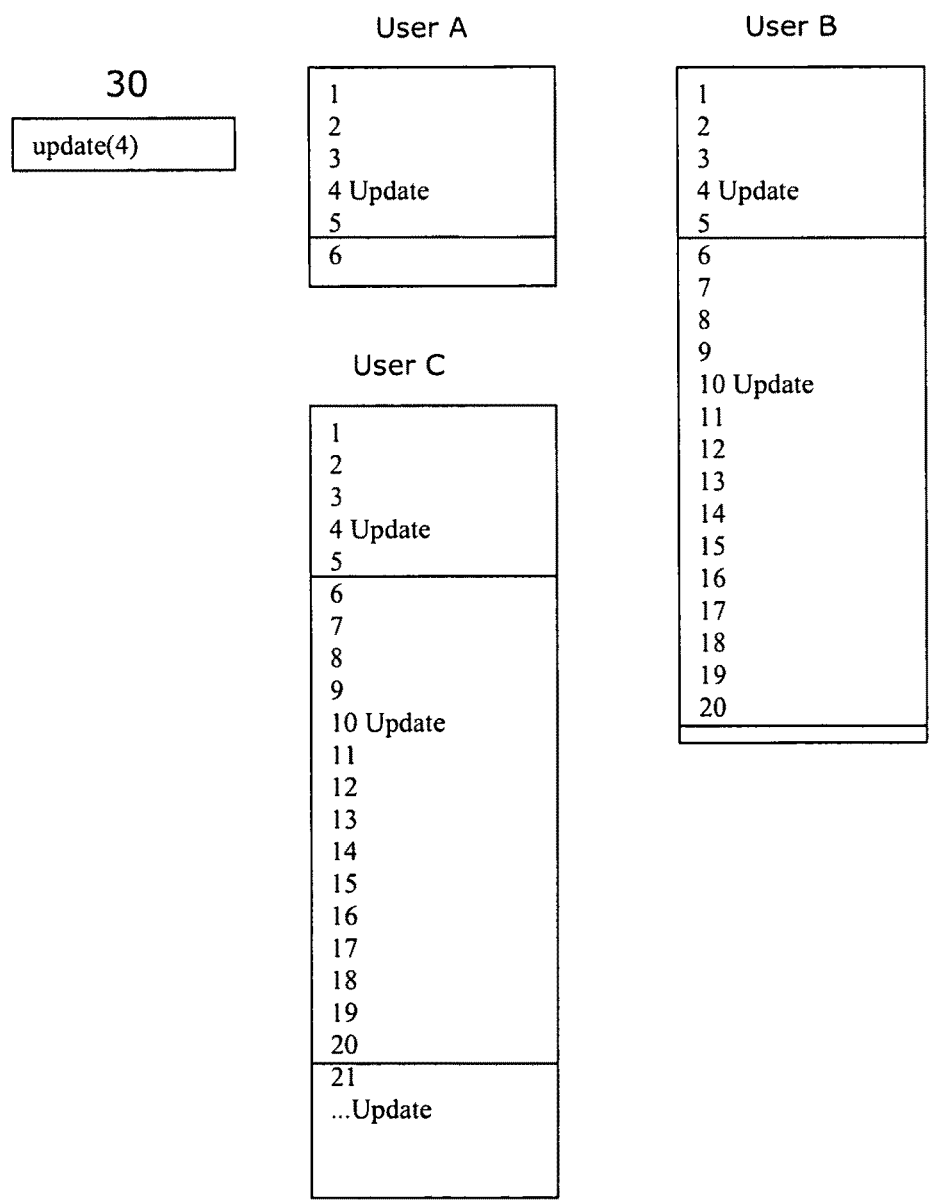
FIG. 12 illustrates an update message for updating a data element in the different subsets. All clients will receive the update message if an update is in the first subset, only the client B and C will receive the update message if the update is in the second subset and only client C will receive the update message if the update is in the third subset.

An update occurs on an existing order in the order book. This can happen when an order is partly traded or modified without any order book priority change. The solution is picturized in the FIG. 12.

Level 1-5—Update that affects an existing order within the top 5 levels.

The system generates the first subset order change 30 broadcast. All clients will receive this broadcast and update their order depth accordingly.

Level 6-20—Update that affects an existing order within the levels 6-20.

The system generates the second subset change order 30 broadcast. Only Client B and Client C will receive this broadcast and update their order depth accordingly, see position 10 in the figures. Client A will not receive this message and his network connection against the central system will therefore not be affected by this change.

Level 21->—Update that affects an existing order the levels 21 and above.

The system generates the third subset change order 30 broadcast. Only Client C will receive this broadcast and update his order depth accordingly, see position >21 in FIG. 12 client C. Client A and Client B will not receive this message and their network connections against the central system will therefore not be affected by this change.

The information dissemination method that is described in this document can be used for many different types of data. The solution can be used in all cases where you have a list of items and where there are clients that are interested in different parts of the list and you would like to distribute the list in real time in an efficient way without duplicating any messages.

Figure 13:
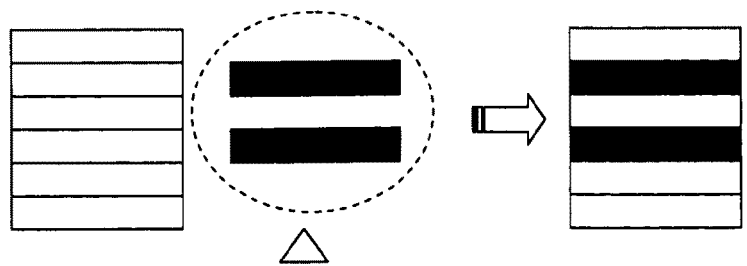
FIG. 13 illustrates how changes may be done in order to update the subset/s at the client computer by sending the data elements that have changed.

FIG. 13 illustrates an update or change of two data elements in a subset. In the figure the system sends the delta changes of the two data element in the update message in order to replace/change the old data elements. The two black rectangles represent data structured as the data elements of at least a part of the superset.

Figure 14:
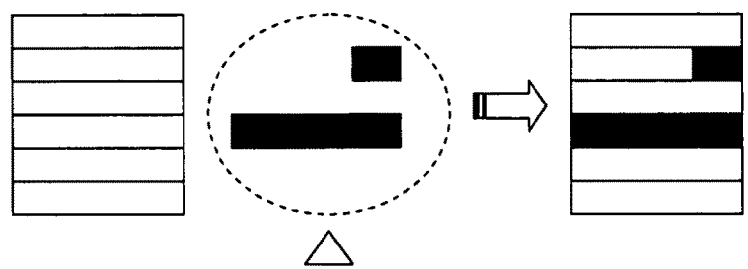
FIG. 14 illustrates how changes may be done in order to update the subset/s at the client computer by sending a delta-change of a data element and a data element.

FIG. 14 illustrates an update or change of two data elements in a subset. In the figure the system sends the delta changes of the data elements represented by the black rectangles. The upper one of the black rectangles represents data structured as a delta-change of at least a part of a data element of at least a part of a superset.

Figure 15:
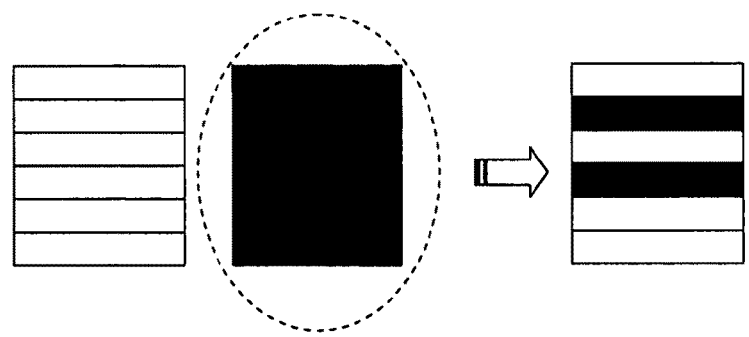
FIG. 15 illustrates how changes may be done in order to update the subset/s at the client computer by sending a snapshot of the superset.

FIG. 15 illustrates an update or change of two data elements in a subset wherein a snap shot of the subset or superset is sent in order to update the set at the client computer.

In the above description the term "comprising" does not exclude other elements or steps and "a" or "an" does not exclude a plurality.

Furthermore the terms "include" and "contain" does not exclude other elements or steps.

The invention claimed is:

1. A method comprising the steps of:
   transmitting from a computer-implemented electronic exchange system to electronic client devices a current list of items sorted in order by the computer-implemented electronic exchange system prior to transmission and in accordance with a value of a market parameter including one of a market-by-order parameter, a market-by-level parameter, or a market-by-price parameter, where the list of sorted items represents a current orderbook of the computer-implemented electronic exchange system and includes pending sorted buy or sell orders for a particular financial instrument, and where a first electronic client device subscribes to the first X sorted items of the current list, X being a positive integer and in a range of 1-20, and a second electronic client device subscribes to the first Y number of sorted items of the current list, where Y>X;
   detecting, by a computer associated with the computer-implemented electronic exchange system, when an item is removed from the first X sorted items of the current list to produce a new list of first X sorted items based on an update message received at the computer-implemented electronic exchange system that indicates a change in relative position from the top of the current list of at least one of the pending sorted buy or sell orders for the particular financial instrument; and
   in response to the detecting step, transmitting a broadcast message to both the first and second electronic client devices that includes the item removed from the first X sorted items such that the first and second electronic client devices are informed of the removed item without having to receive the entire new list so that the first and second electronic client devices can manipulate their corresponding sorted items of the current list using the item removed from the X sorted items.

2. The method according to claim 1, wherein the method further comprises the step of broadcasting to each of the client devices an item to be added at the lowest ranked position of the sorted items subscribed to by the respective client device.

3. The method according to claim 2, wherein the item to be added at the lowest ranked position of the sorted items subscribed to by the respective client device is included in the broadcast message.

4. A computer-implemented electronic exchange system comprising:
   a transmitter configured to transmit from the computer-implemented electronic exchange system to electronic clients a current list of items sorted in order by the computer-implemented electronic exchange system prior to transmission and in accordance with a value of a market parameter including one of a market-by-order parameter, a market-by-level parameter, or a market-by-price parameter, where the list of sorted items represents a current orderbook of the computer-implemented electronic exchange system and includes pending sorted buy or sell orders for a particular financial instrument, and where a first electronic client device subscribes to the first X sorted items of the current list, X being a positive integer and in a range of 1-20, and a second electronic client device subscribes to the first Y number of sorted items of the current list, where Y>X, and
   electronic circuitry configured to detect when an item is removed from the first X sorted items of the current list to produce a new list of first X sorted items based on an update message received at the computer-implemented electronic exchange system that indicates a change in relative position from the top of the current list of at least one of the pending sorted buy or sell orders for the particular financial instrument; and
   the transmitter, in response to the detection, configured to transmit a broadcast message to both the first and second electronic client devices that includes the item removed from the first X sorted items such that the first and second electronic clients are informed of the removed item without having to receive the entire new list so that the first and second electronic clients can manipulate their corresponding sorted items of the current list using the item removed from the X sorted items.

5. The computer-implemented electronic exchange system according to claim 4, wherein the transmitter is configured to broadcast to each of the client devices an item to be added at the lowest ranked position of the sorted items subscribed to by the respective client device.

6. The computer-implemented electronic exchange system according to claim 5, wherein the transmitter is configured to include in the broadcast message the item to be added at the lowest ranked position of the sorted items subscribed to by the respective client device.

7. A method to be performed in a client computer apparatus for managing a client list of items sorted in an order by a computer-implemented electronic exchange system prior to transmission to the client computer apparatus, where the sorting is in accordance with a value of a market parameter including one of a market-by-order parameter, a market-by-level parameter, or a market-by-price parameter, where the list relates to transactions in the computer-implemented electronic exchange system and includes pending sorted buy or sell orders for a particular financial instrument, where the client subscribes to the first X sorted items of a current list of sorted items in the computer-implemented electronic exchange system, X being a positive integer and in a range of 1-20, and the list of sorted items representing a current orderbook of the computer-implemented electronic exchange system, the method comprising the steps of:
   receiving and displaying the first X sorted items from the current sorted list as the client list;
   receiving a broadcast message from the computer-implemented electronic exchange system indicating removal of one item from the current sorted list based on an update message received at the computer-implemented electronic exchange that indicates a change in relative position from the top of the current list of at least one of the pending sorted buy or sell orders for the particular financial instrument, and
   in response to the receipt of the broadcast message, the client computer apparatus removing the one item from the client list,
   wherein if another broadcast message indicates removal of an item from the current list that is not included in the first X sorted items, the client computer apparatus sets an indicator to ignore the another broadcast message.

8. The method according to claim 7, further comprising the step of adding a new item at position X of the client list when the one item is removed.

9. The method according to claim 8, wherein the new item to be added at position X of the client list is received in the same broadcast message that indicates the removal of one item from the client list.

10. A client computer apparatus for managing a client list of items sorted in an order by a computer-implemented electronic exchange system prior to transmission to the client computer apparatus, where the sorting is in accordance with a value of a market parameter including one of a market-by-order parameter, a market-by-level parameter, or a market-by-price parameter, where the list relates to transactions in the computer-implemented electronic exchange system and includes pending sorted buy or sell orders for a particular financial instrument, where the client subscribes to the first X sorted items of a current list of sorted items in the computer-implemented electronic exchange system, X being a positive integer and in a range of 1-20, and the current list of sorted items representing a current orderbook of the computer-implemented electronic exchange system, the client computer apparatus comprising:
   an interface configured to receive the first X sorted items from the current sorted list as the client list;
   a display configured to display the first X sorted items from the current sorted list as the client list;
   the interface being configured to receive a broadcast message from the computer-implemented electronic trading exchange system indicating removal of one item from the current sorted list, a memory configured to store a set of X sorted items, and
   a message handler configured to manage the set of X sorted items and remove a corresponding item from the set of X sorted items if the received broadcast message indicates removal of one of the first X sorted items based on an update message received at the computer-implemented electronic exchange system that indicates a change in relative position from the top of the current list of at least one of the pending sorted buy or sell orders for the particular financial instrument,
   wherein the message handler is further configured set an indicator to ignore another broadcast message if another broadcast message indicates removal of an item from the current list that is not included in the first X sorted items.

11. The client computer apparatus according to claim 10, wherein the message handler is arranged to add a new item at position X of the set of X sorted items when an item is removed.

12. The client computer apparatus according to claim 11, wherein the message handler is arranged to extract an item to be added at position X from the same broadcast message that indicates the removal of one item from the current list.

13. A method comprising:

transmitting from a computer-implemented electronic exchange system to at least two types of electronic client apparatus a change in a current list of items sorted in an order by the computer-implemented electronic exchange system prior to transmission and in accordance with a value of a market parameter including one of a market-by-order parameter, a market-by-level parameter, or a market-by-price parameter, where the list of sorted items represents a current orderbook of the computer-implemented electronic trading exchange system and includes pending sorted buy or sell orders for a particular financial instrument, where a first electronic client apparatus subscribes to the first X sorted items of the current list, X being a positive integer and in a range of 1-20, and a second electronic client apparatus subscribes to the first Y number of sorted items of the current list, where Y>X; and detecting, by a computer associated with the computer-implemented electronic exchange system, when an item is added to the first X sorted items of the current list to produce a new list of first X sorted items based on an update message received at the computer-implemented electronic exchange system that indicates a change in relative position from the top of the current list of at least one of the pending sorted buy or sell orders for the particular financial instrument; and in response to the detecting step, transmitting a broadcast message to both the first and second electronic client apparatuses that includes the item added to the first X sorted items of the current list such that the first and second electronic client apparatuses are informed of the added item without having to receive the entire new list so that the first and second electronic client apparatuses can manipulate their corresponding sorted items of the current list using the item removed from the X sorted items.

14. A computer-implemented electronic exchange system comprising:

a transmitter configured to transmit from the computer-implemented electronic exchange system to electronic client devices a current list of items sorted in an order by the computer-implemented electronic exchange system prior to transmission and in accordance with a value of a market parameter including one of a market-by-order parameter, a market-by-level parameter, or a market-by-price parameter, where the list of sorted items represents a current orderbook of the computer-implemented electronic exchange system and includes pending sorted buy or sell orders for a particular financial instrument, a first electronic client device subscribes to the first X sorted items of the current list, X being a positive integer and in a range of 1-20, and a second electronic client device subscribes to the first Y number of sorted items of the current list, where Y>X, and electronic circuitry configured to detect when an item is added to the first X sorted items of the current list to produce a new list of first X sorted items based on an update message received at the computer-implemented electronic exchange that indicates a change in relative position from the top of the current list of at least one of the pending sorted buy or sell orders for the particular financial instrument; and wherein the transmitter, in response to the detection, is configured to transmit a broadcast message to both the first and second electronic client devices that includes the item added to the first X sorted items of the current list such that the first and second electronic client devices are informed of the added item without having to receive the entire new list so that the first and second electronic client devices can manipulate their corresponding sorted items of the current list using the item removed from the X sorted items.

15. A method to be performed in a client computer apparatus for managing a client list of items sorted in an order by a computer-implemented electronic exchange system prior to transmission to the client computer apparatus, where the sorting is in accordance with a value of a market parameter including one of a market-by-order parameter, a market-by-level parameter, or a market-by-price parameter, where the list relates to transactions in the computer-implemented electronic exchange system and includes pending sorted buy or sell orders for a particular financial instrument, where the client apparatus subscribes to the first X items of a current list of sorted items in the computer-implemented electronic exchange, X being a positive integer and in a range of 1-20, and the list of sorted items representing a current orderbook of the computer-implemented electronic exchange system, the method comprising the steps of:

receiving and displaying the first X sorted items from the current sorted list as the client list;

receiving a broadcast message from the computer-implemented electronic exchange system indicating adding of one item to the current sorted list based on an update message received at the computer-implemented electronic exchange system that indicates a change in relative position from the top of the current list of at least one of the pending sorted buy or sell orders for the particular financial instrument, and in response to the receipt of the broadcast message, the client computer apparatus adding the one item to the client list, wherein if another broadcast message indicates adding an item to the current list that is not included in the first X sorted items, the client computer apparatus sets an indicator to ignore the another broadcast.

16. The method according to claim 15, further comprising the step of removing the item at position X of the list when a new item is added.

17. A client computer apparatus for managing a client list of items sorted in an order by a computer-implemented electronic exchange system prior to transmission to the client computer apparatus, where the sorting is in accordance with a value of a market parameter including one of a market-by-order parameter, a market-by-level parameter, or a market-by-price parameter, where the list relates to transactions in the computer-implemented electronic exchange system and includes pending sorted buy or sell orders for a particular financial instrument. where the client apparatus subscribes to the first X sorted items of a current list of sorted items in the computer-implemented electronic exchange, X being a positive integer and in the range of 1-20, and where the list of sorted items represents a current orderbook of the computer-implemented electronic exchange system, the client computer apparatus comprising:

an interface configured to receiving the first X sorted items from the current sorted list as the client list;

a display configured to display the first X sorted items from the current sorted list as the client list;

where the interface is further configured to receive a broadcast message from the computer-implemented electronic exchange system indicating adding of one item to the current sorted list based on an update message received at the computer-implemented electronic exchange system that indicates a change in relative position from the top of the current list of at least one of the pending sorted buy or sell orders for the particular financial instrument, a memory configured to store a set of X sorted items, and a message handler configured to manage the set of X sorted items and add a corresponding item to the set of X sorted items if the received broadcast message indicates adding one of the first X items to the current list, wherein the message handler is further arranged to set an indicator to ignore another broadcast message if the another broadcast message indicates adding an item to the current list that is not included in the first X sorted items.

18. The client computer according to claim 17, wherein the message handler is arranged to remove the item at position X of the list when a new item is added.

19. A method comprising the steps of:

transmitting from a computer-implemented electronic exchange system to electronic client devices a current list of items sorted in an order by the computer-implemented electronic exchange system prior to transmission and in accordance with a value of a market parameter including one of a market-by-order parameter, a market-by-level parameter, or a market-by-price parameter, where the list of sorted items represents a current orderbook of the computer-implemented electronic exchange system and includes pending sorted buy or sell orders for a particular financial instrument, a first electronic client device subscribes to the first X sorted items of the current list, X being a positive integer and in a range of 1-20, and a second electronic client device subscribes to the first Y number of sorted items of the current list, where Y>X;

detecting, by a computer associated with the computer-implemented electronic exchange system, when an item is updated in the first X sorted items of the current list to produce a new list of first X sorted items based on an update message received at the computer-implemented electronic exchange system that indicates a change in relative position from the top of the current list of at least one of the pending sorted buy or sell orders for the particular financial instrument; and in response to the detecting step, transmitting a broadcast message to both the first and second electronic client devices that includes the item updated in the first X sorted items of the current list such that the first and second electronic client devices are informed of the updated item without having to receive the entire new list so that the first and second electronic client devices can manipulate their corresponding sorted items of the current list using the item removed from the X sorted items.

20. A computer-implemented electronic exchange system comprising:

a transmitter configured to transmit from a computer-implemented electronic exchange system to electronic client devices a current list of items sorted in an order by the computer-implemented electronic exchange system prior to transmission and in accordance with a value of a market parameter including one of a market-by-order parameter, a market-by-level parameter, or a market-by-price parameter, where the list of sorted items represents a current orderbook of the computer-implemented electronic exchange system and includes pending sorted buy or sell orders for a particular financial instrument, a first electronic client device subscribes to the first X sorted items of the current list, X being a positive integer and in a range of 1-20, and a second electronic client device subscribes to the first Y number of sorted items of the current list, where Y>X, and electronic circuitry configured to detect when an item is updated in the first X sorted items of the current list to produce a new list of first X sorted items based on an update message received at the computer-implemented electronic exchange system that indicates a change in relative position from the top of the current list of at least one of the pending sorted buy or sell orders for the particular financial instrument; and the transmitter, in response to the detection, configured to transmit a broadcast message to both the first and second electronic client devices that includes the item updated in the first X sorted items of the current list such that the first and second electronic client devices are informed of the updated item without having to receive the entire new list so that the first and second electronic client devices can manipulate their corresponding sorted items of the current list using the item removed from the X sorted items.

21. A method to be performed in a client computer apparatus for managing a client list of items sorted in an order by a computer-implemented electronic exchange system prior to transmission to the client computer apparatus, where the sorting is in accordance with a value of a market parameter including one of a market-by-order parameter, a market-by-level parameter, or a market-by-price parameter, where the list relates to transactions in the computer-implemented electronic exchange system and includes pending sorted buy or sell orders for a particular financial instrument, where the list of sorted items represents a current orderbook of the computer-implemented electronic system system and the client apparatus subscribes to the first X sorted items of a current list of sorted items in the computer-implemented electronic exchange, X being a positive integer and in a range of 1-20, the method comprising the steps of:

receiving and displaying the first X sorted items from the current sorted list as the client list;

receiving a broadcast message from the computer-implemented electronic exchange system indicating an update of one item in the current sorted list based on an update message received at the computer-implemented electronic exchange system that indicates a change in relative position from the top of the current list of at least one of the pending sorted buy or sell orders for the particular financial instrument, and in response to the receipt of the broadcast message, the client computer apparatus updating the client list, wherein if a broadcast message indicates an update of an item from the current list that is not included in the first X sorted items, the client computer apparatus sets an indicator to ignore that broadcast message.

22. A client computer apparatus for managing a list of items sorted in an order by a computer-implemented electronic exchange system prior to transmission to the client computer apparatus, where the sorting is in accordance with a value of a market parameter including one of a market-by-order parameter, a market-by-level parameter, or a market-by-price parameter, where the list relates to transactions in an orderbook of the computer-implemented electronic exchange system and includes pending sorted buy or sell orders for a particular financial instrument, where the client subscribes to the first X sorted items of the list, X being a positive integer and in a range of 1-20, the client computer apparatus comprising:

- an interface configured to receive the first X sorted items from the current sorted list as the client list;
- a display configured to display the first X sorted items from the current sorted list as the client list;
- the interface further configured to receive a broadcast message indicating an update of one item in the current sorted list based on an update message received at the computer-implemented electronic exchange system that indicates a change in relative position from the top of the current list of at least one of the pending sorted buy or sell orders for the particular financial instrument,
- a memory configured to store a set of X sorted items, and
- a message handler configured to manage the set of X sorted items,
- wherein the message handler is configured to update a corresponding item if a received broadcast message indicates an update of one of the first X sorted items and to set an indicator to ignore a received broadcast message if the received broadcast message indicates an update of another item.

* * * * *